United States Patent
Kim et al.

(10) Patent No.: US 11,062,651 B2
(45) Date of Patent: Jul. 13, 2021

(54) DISPLAY DEVICE

(71) Applicant: LG DISPLAY CO., LTD., Seoul (KR)

(72) Inventors: Nakyoon Kim, Paju-si (KR); Jisu Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/688,048

(22) Filed: Nov. 19, 2019

(65) Prior Publication Data

US 2020/0184890 A1 Jun. 11, 2020

(30) Foreign Application Priority Data

Dec. 10, 2018 (KR) .......................... 10-2018-0158362

(51) Int. Cl.
| | |
|---|---|
| *G09G 3/3233* | (2016.01) |
| *G09G 3/3291* | (2016.01) |
| *H02M 3/04* | (2006.01) |
| *H02J 7/00* | (2006.01) |

(52) U.S. Cl.
CPC ......... *G09G 3/3233* (2013.01); *G09G 3/3291* (2013.01); *G09G 2310/0297* (2013.01); *G09G 2330/021* (2013.01); *H02J 2007/0067* (2013.01); *H02J 2207/20* (2020.01); *H02M 3/04* (2013.01)

(58) Field of Classification Search
CPC ............... G09G 3/3233; G09G 3/3291; G09G 2330/021; G09G 2310/0297; H02J 2207/20; H02J 2007/0067; H02M 3/04
See application file for complete search history.

(56) References Cited

U.S. PATENT DOCUMENTS

| | | | | |
|---|---|---|---|---|
| 5,804,894 | A | * | 9/1998 | Leeson ............ G01R 19/16542 307/130 |
| 2004/0070996 | A1 | * | 4/2004 | Carr ....................... H05B 3/342 363/21.01 |
| 2010/0301837 | A1 | * | 12/2010 | Higuma ............... G01R 21/133 324/140 R |
| 2011/0267377 | A1 | * | 11/2011 | Kim ..................... G09G 3/3406 345/690 |
| 2011/0273109 | A1 | | 11/2011 | Park |

FOREIGN PATENT DOCUMENTS

| | | | |
|---|---|---|---|
| KR | 10-2011-0123983 A | | 11/2011 |
| KR | 10-2017-0081059 A | | 7/2017 |

* cited by examiner

*Primary Examiner* — Mark W Regn
(74) *Attorney, Agent, or Firm* — Birch, Stewart, Kolasch & Birch, LLP

(57) ABSTRACT

A display device can include a display unit including data lines, gate lines crossing the data lines and pixels; a voltage generating unit configured to generate driving voltages for driving the display unit based on a voltage from a battery; and a data driver configured to convert input image data into data voltages and output the data voltages to the data lines, wherein the voltage generating unit includes a battery current control unit configured to control a magnitude of a low potential driving voltage applied to cathode electrodes of the pixels according to an amount of a battery output current flowing from the battery to the voltage generating unit, and wherein the battery current control unit is configured to increase the low potential driving voltage when the battery output current is equal to or greater than a predetermined threshold value.

15 Claims, 6 Drawing Sheets

DISPLAY DEVICE

This application claims the priority benefit of Korean Patent Application No. 10-2018-0158362 filed in the Republic of Korea on Dec. 10, 2018, which is incorporated herein by reference for all purposes as if fully set forth herein.

BACKGROUND OF THE INVENTION

Field of the Invention

The present disclosure relates to a display device, and more particularly to a display device including a battery current control unit.

Discussion of the Related Art

With the recent trend toward an information age, display fields for visually expressing electrical information signals have been rapidly developed. In response to this, various display devices having excellent performance and features such as being slim, light weight, and low power consumption have been developed.

Specific examples of such display devices include a liquid crystal display device LCD, an organic light emitting display device, a quantum dot display device, etc.

The display devices can include a display panel including subpixels, a driver for outputting driving signals for driving the display panel, and a power supply for generating power to be supplied to the display panel or the driver.

When driving signals, for example, a scan signal, a data signal, or the like, are supplied to the subpixels formed on the display panel, selected subpixels transmit light or directly emit light to display an image.

Some of the display devices have electrical and optical characteristics such as high response speed, high brightness and wide viewing angle, and mechanical characteristics that can implement the device in a flexible form. For example, an active matrix type organic light emitting display device includes an organic light emitting diode OLED that emits light by itself, and has advantages such as high response speed, high light-emitting efficiency, high luminance, and a wide viewing angle.

The display device can arrange pixels in a matrix form and adjust the luminance of the pixels according to the gradation of image data. Each pixel includes a thin film transistor TFT that controls a pixel current flowing in the OLED according to a voltage Vgs applied between its gate electrode and source electrode, and can adjust the display gradation or luminance by the amount of the light emitted proportional to the pixel current.

The display device applied to a portable terminal generally generates driving voltages for driving a display panel using a battery voltage. When remaining battery power is reduced, a battery voltage is lowered and battery efficiency is reduced. When the display device is driven in a state in which the battery efficiency is reduced, the display device becomes more heat-consuming and battery consumption progresses very quickly. To prevent this, the portable terminal detects the magnitude of a battery output current when the battery voltage is extremely low and the battery efficiency is low, and can shut off the output of the battery voltage based on the detected magnitude of the battery output current.

However, there is a problem that the battery voltage is cut off under certain conditions even within a range in which the display device should be stably driven.

SUMMARY OF THE INVENTION

Therefore, it is an object of the present disclosure to provide a display device capable of preventing the battery voltage from being blocked within a normal range.

The display device according to the present disclosure can comprise a comparator, an output controller and an output unit. The comparator compares a battery voltage converted from a battery output current and a threshold voltage, outputs a first logic voltage when the battery voltage is equal to or higher than a first threshold value and outputs a second logic voltage when the battery voltage is lower than the first threshold value. The output controller outputs a first control signal according to the first logic voltage from the comparator and outputs a second control signal according to the second logic voltage. And, the output unit outputs a first low potential driving voltage according to the first control signal and outputs a second low potential driving voltage according to the second control signal.

The display device according to an embodiment of the present disclosure can comprise a display unit, a voltage generator, a driving circuit unit and a battery current control unit. The display unit is equipped with data lines, gate lines crossing the data lines and pixels. The voltage generating unit is configured to generate driving voltages for driving the display unit based on a voltage from a battery. The driving circuit unit is configured to convert input image data into data voltages and output the data voltages to the data lines. The battery current control unit is configured to control a magnitude of a low potential driving voltage applied to cathode electrodes of the pixels according to an amount of a current flowing from the battery to the voltage generating unit, and can increase the low potential driving voltage when the battery output current is equal to or greater than a predetermined threshold value In the present disclosure, the magnitude of the low potential driving voltage is adjusted based on the magnitude of the battery voltage. Because the power consumed by a panel varies according to the magnitude of the low potential driving voltage, the magnitude of a battery current is also regulated. Therefore, it is possible to control whether to cause the battery blocking unit to perform its operation based on the magnitude of the battery current. As a result, it is possible to prevent unwanted battery shutdown from occurring when the battery is within a normal range.

The effects of the present specification are not limited to the effects mentioned above and below, and other effects not mentioned can be clearly understood by those skilled in the art from the following description.

The scope of the claims of the present disclosure is not limited by what is described in the specification.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
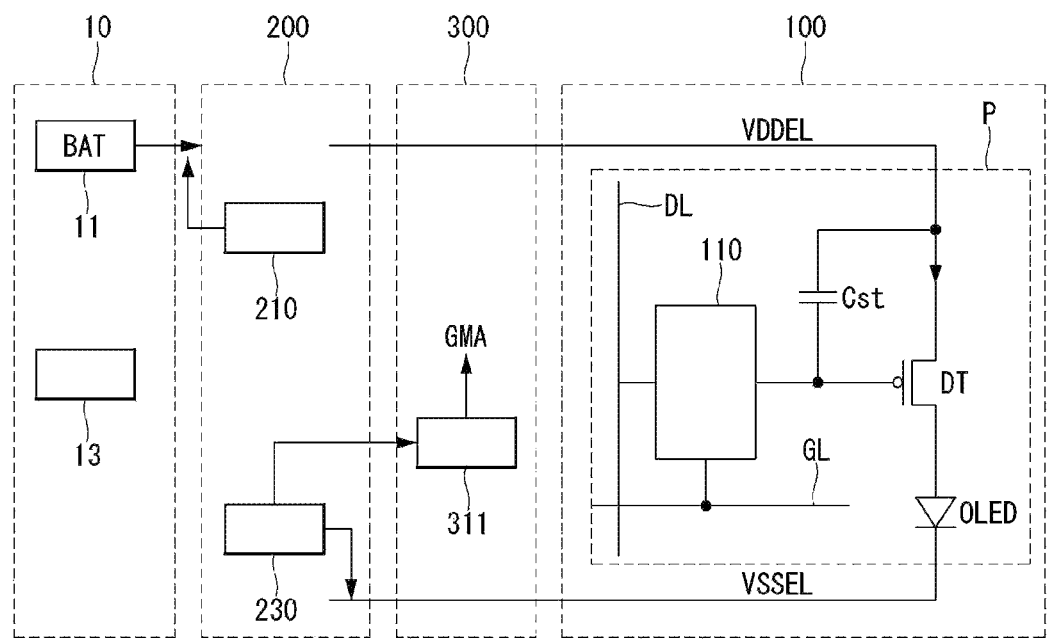
FIG. 1 is a diagram showing a display device according to an embodiment of the present disclosure.

The advantages and features of the present invention and methods of accomplishing the same can be understood more readily by reference to the following detailed descriptions of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims.

The shapes, sizes, percentages, angles, numbers, etc. shown in the figures to describe the exemplary embodiments of the present invention are merely examples and not limited to those shown in the figures. Like reference numerals denote like elements throughout the specification. In describing the present invention, detailed descriptions of related well-known technologies will be omitted to avoid unnecessary obscuring the present invention. When the terms 'comprise', 'have', 'consist of' and the like are used, other parts can be added as long as the term 'only' is not used. The singular forms can be interpreted as the plural forms unless explicitly stated.

The elements can be interpreted to include an error margin even if not explicitly stated.

When the position relation between two parts is described using the terms 'on', 'over', 'under', 'next to' and the like, one or more parts can be positioned between the two parts as long as the term 'immediately' or 'directly' is not used.

It will be understood that, although the terms first, second, etc., can be used to describe various elements, these elements should not be limited by these terms. These terms are only used to distinguish one element from another element. Thus, a first element referred to below can be a second element within the scope of the present disclosure.

Respective features of the various embodiments of the present disclosure can be combined or combined with each other, partially or wholly, and technically various interlocking and driving of them are possible. Each embodiment can be feasible independently of one another and can be feasible in conjunction.

Hereinafter, the embodiments of the present disclosure will be described with reference to an organic light emitting display device. However, it should be noted that the present disclosure is not limited thereto and can be applied to a liquid crystal display device LCD, a quantum dot display apparatus, and the like.

Hereinafter, the embodiments of the present disclosure will be described in detail with reference to accompanying drawings.

FIG. 1 is a diagram a the display device according to an embodiment of the present disclosure. All components of the display device according to all embodiments of the present disclosure are operatively coupled and configured.

Referring to FIG. 1, the display device according to the embodiment of the present disclosure includes a system board 10, a display unit 100, a voltage generating unit 200 and a driving circuit unit 300.

In the display unit 100, data lines DL and gate lines GL cross each other, and pixels P are disposed in a matrix form at respective crossing regions. Each pixel P can be one of a red subpixel, a green subpixel and a blue subpixel for implementing colors, or may represent a white subpixel.

Each pixel P can include an OLED including an organic compound layer disposed between an anode electrode and a cathode electrode. Each pixel P further can include a driving transistor DT, a capacitor Cst and a compensation circuit 110. The driving transistor DT controls a driving current applied to the pixel according to a source-gate voltage Vsg of the driving transistor DT.

The compensation circuit 110 can receive a data voltage from the corresponding data line DL in response to the gate signal applied through the corresponding gate line GL, and store the data voltage in the capacitor Cst connected to the gate electrode of the driving transistor DT. The compensation circuit 110 can include an internal compensating circuit for programming the data voltage and compensating for the variation of the threshold voltage of the driving transistor DT.

The system board 10 can comprise a battery 11 and one or more peripheral device(s) 13. The battery 11 is connected to the voltage generating unit 200, and the voltage generating unit 200 becomes a power source for generating a driving voltage. The peripheral device 13 can include a speaker, a camera, a wireless communication block, and the like.

The voltage generating unit 200 can generate the driving voltage for driving the driving circuit unit 300 and the display unit 100 by using the voltage supplied from the battery 11. The driving voltage can include a high potential driving voltage VDDEL, a low potential driving voltage VSSEL, a driving circuit driving voltage, and the like. The high potential driving voltage VDDEL is applied to the source electrode or the drain electrode of the driving transistor DT and the low potential driving voltage VSSEL is applied to the cathode electrode of the pixel. The driving circuit driving voltage is provided to an analog-to-digital converter DAC and a gamma voltage generator 311 of the driving circuit unit 300 and the like.

The voltage generating unit 200 of the present disclosure can comprise a battery blocking unit 210 and a battery current control unit 230.

The battery blocking unit 210 blocks or cuts off a current flow from the battery 11 to the voltage generating unit 200 when a battery current reaches a predetermined cut-off value. The battery current control unit 230 increases the low potential driving voltage VSSEL when the battery current reaches a predetermined threshold value. When the low potential driving voltage VSSEL is increased by the battery current control unit 230, the battery current value is reduced and the operation of the battery blocking unit 210 can be relaxed.

The detailed configuration and operations of the battery blocking unit 210 and the battery current control unit 230 will be described later.

The driving circuit unit 300 can comprise a timing controller, a data driver, a gate driver and the gamma voltage generating unit 311.

The timing controller of the driving circuit unit 300 generates data control signals for controlling the operation timings of the data driver and gate control signals for controlling the operation timings of the gate driver based on timing signals. The data driver of the driving circuit unit 300 includes a digital-to-analog converter DAC for generating a data voltage based on image data, and provides the data voltage to the data line DL. The gate driver of the driving circuit 300 generates gate pulses based on the gate control signals supplied from the timing controller, and outputs the gate pulses to the gate lines GL. For this, the gate driver can include shift registers that are connected to each other, and the shift registers can be formed directly on the bezel of the display unit 100 according to a gate-driver in panel GIP scheme.

The gamma voltage generating unit 311 generates gamma voltages provided to the DAC of the data driver and differently adjusts the gamma voltages depending on bands. In particular, the gamma voltage generating unit 311 according to the present disclosure varies the bands according to the control signal of the battery current control unit 230, and accordingly, the magnitudes of the gamma voltages can be adjusted.

Figure 2:
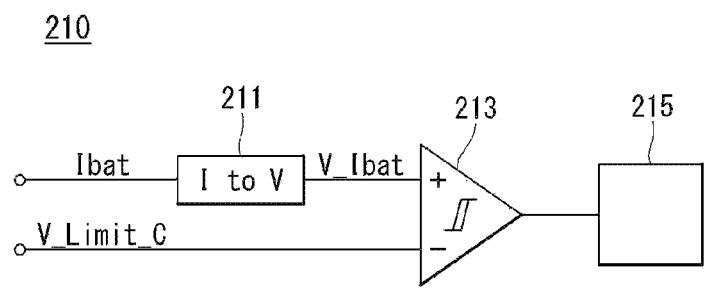
FIG. 2 is a view showing the configuration of a battery blocking unit.

FIG. 2 is a view showing the configuration of the battery blocking unit 210 of FIG. 1.

Referring to FIG. 2, the battery blocking unit 210 cuts off the output of the battery 11 when the battery output current (e.g., current that is output by the battery 11 at a current/given time) reaches a preset current value. To this end, the battery blocking unit 210 includes a current-voltage converter 211, a comparator 213, and a shutdown unit 215.

In order to determine the magnitude of the battery output current, the battery blocking unit 210 converts a battery output current Ibat from the battery 11 into a battery voltage and compares it with a predetermined cutoff threshold value V_Limit_C. Specifically, the current-voltage converter 211 receives the battery output current Ibat and converts it to a battery voltage V_Ibat. The battery output current Ibat refers to the current applied from the battery 11 to the voltage generating unit 200. The current-voltage converter 211 includes a shunt resistor, and can output a magnitude proportional to the current flowing from the battery 11 and the resistance value of the shunt resistor as the battery voltage V_Ibat. The cutoff threshold value V_Limit_C is a preset voltage value, which is obtained by converting the limit value of the battery current of the voltage generating unit 200 into a voltage value. The cutoff threshold value V_Limit_C can be set to a value obtained by converting the limit value of the battery current by using a resistance value having the same magnitude as the shunt resistance included in the current-voltage converter 211.

The comparator 213 compares the battery voltage V_Ibat with the cutoff threshold value V_Limit_C, and outputs a comparison voltage based on the comparison result. The comparator 213 can output a high voltage when the battery voltage V_Ibat is greater than or equal to the cutoff threshold value V_Limit_C, and can output a low voltage when the battery voltage V_Ibat is lower than the cutoff threshold value V_Limit_C.

The shutdown unit 215 can shut off the current flowing from the battery 11 to the voltage generating unit 200 when the logic voltage from the comparator 213 is the high voltage, e.g., when the battery voltage V_Ibat is greater than or equal to the cutoff threshold value V_Limit_C. The shutdown unit 215 does not operate when the logic voltage from the comparator 213 is the low voltage, e.g., when the battery voltage V_Ibat is less than the cutoff threshold value V_Limit_C.

Figure 3:
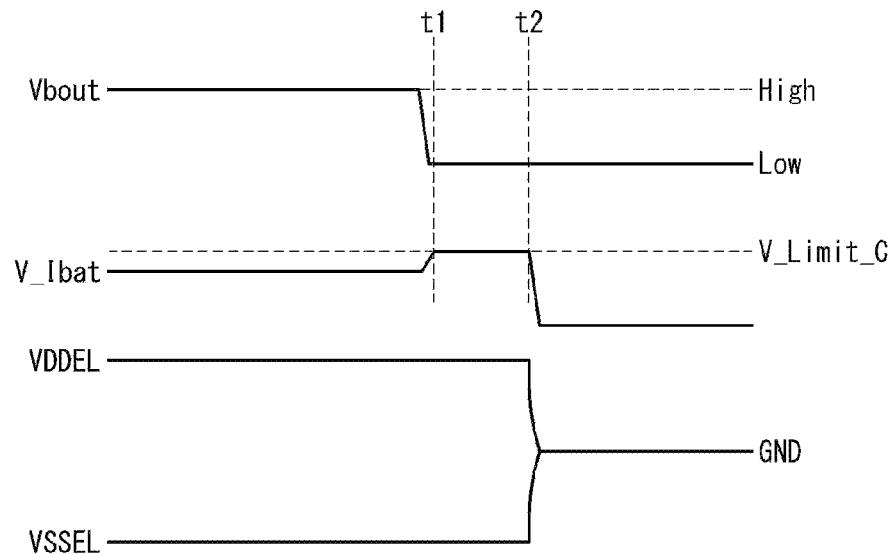
FIG. 3 is a diagram showing the operation timing of the battery blocking unit.

FIG. 3 is a diagram showing the operation timing of the battery blocking unit 210.

Referring to FIGS. 2 and 3, a battery charging voltage Vbout is lowered at a first timing t1. The battery charging voltage Vbout refers to the voltage value according to the remaining capacity of the battery 11. If the battery charging voltage Vbout is lowered, efficiency can be lowered. When the pixels P of the display unit 100 display an image at a high luminance at the first timing t1 when the battery efficiency is lowered, the driving current flowing into the pixels can increase. As a result, the battery current flowing into the voltage generating unit 200 from the battery 11 increases, and the battery voltage V_Ibat increases as the battery current increases. That is, when the battery voltage V_Ibat becomes higher at the first timing t1 and reaches the cutoff threshold value V_Limit_C, the comparator 213 then outputs the first logic voltage (e.g., the high voltage). The shutdown unit 215 then blocks the current flow from the battery 11 when the first logic voltage is held for a predetermined period of time, for example, from the first timing t1 to a second timing t2. For instance, at the second timing t2, the shutdown unit 215 cuts off the current flow from the battery 11 to the voltage generating unit 220. As a result, the voltage generating unit 200 is turned off since no battery current is provided, and accordingly, the display device may be turned off.

One reason why the battery blocking unit 210 turns off the display device in accordance with a specific condition in a state where the battery charging voltage Vbout is lowered is to prevent the display device from generating heat when the voltage generating unit 200 is out of a normal driving range, by causing the voltage generating unit 200 to perform its operations only within a range in which the voltage generating portion 200 can operate normally.

The shutoff threshold value V_Limit_C at which the shutdown unit 215 of the battery blocking unit 210 operates is related to the reliability of the battery charging voltage Vbout. The display device is configured such that the operation of shutting off the battery 11 is not performed when the battery charging voltage Vbout is equal to or higher than a predetermined voltage.

Figure 4:
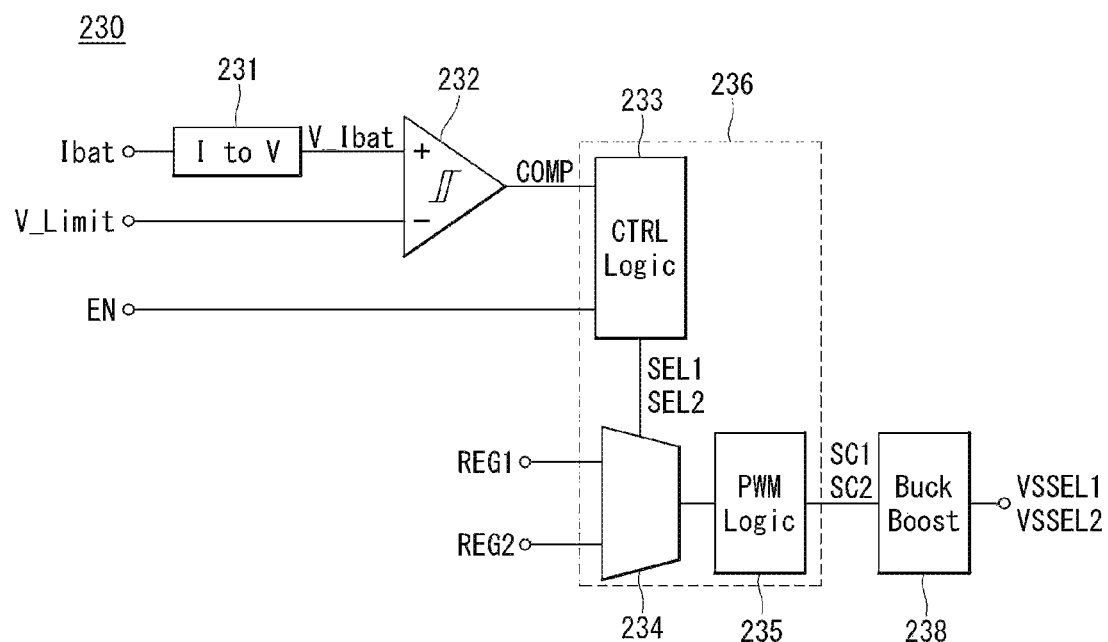
FIG. 4 is a diagram illustrating the configuration of a battery current control unit (battery current controller) according to an embodiment of the present disclosure.

FIG. 4 is a diagram illustrating the configuration of the battery current control unit 230 of FIG. 1 according to an embodiment of the present disclosure.

Referring to FIG. 4, the battery current control unit 230 of the present disclosure can increase the magnitude of the low potential driving voltage VSSEL when the battery output current Ibat is equal to or higher than the threshold value. The battery current control unit 230 can convert the battery output current Ibat into the battery voltage V_Ibat and compare the battery voltage V_Ibat with the threshold voltage V_Limit. To this end, the battery current control unit 230 can include a current-voltage converter 231, a comparator 232, an output controller 236, and an output unit 238.

The comparator 232 compares the battery voltage V_Ibat with the threshold voltage V_Limit and outputs the comparison voltage COMP based on the comparison result. The current-voltage converter 231 can receive the battery output current Ibat to generate the battery voltage V_Ibat. The current-voltage converter 231 includes a shunt resistor and can output the battery voltage V_Ibat proportional to the battery output current Ibat and the resistance value by using the resistance value of the shunt resistor. The threshold voltage V_Limit is a predetermined voltage value obtained by converting the input limit current of the voltage generating unit 200 into a voltage value based on the same resistance value as the resistance value of the shunt resistor included in the current-voltage converter 231.

The comparator 232 outputs the comparison voltage COMP of a first logic voltage when the battery voltage V_Ibat is equal to or greater than the threshold voltage V_Limit, and outputs the comparison voltage COMP of a second logic voltage when the battery voltage V_Ibat is less than the threshold voltage V_Limit. As an example, the first logic voltage of the comparison voltage COMP can be a low voltage and the second logic voltage of the comparison voltage COMP can be a high voltage.

The output controller 236 outputs a first control signal SC1 according to the first logic voltage from the comparator 232 and outputs a second control signal SC2 according to the second logic voltage. The output controller 236 can include a logic unit 233, a multiplexer 234, and a pulse width modulation PWM controller 235.

The logic unit 233 can output a first selection signal SEL1 or a second selection signal SEL2 according to the voltage level of the comparison voltage COMP. The logic unit 233 can output the first selection signal SEL1 when the comparison voltage COMP is the first logic voltage, and output the second selection signal SEL2 when the comparison voltage COMP is the second logic voltage. Whether or not the logic unit 233 operates can be controlled by an enable signal EN implemented with a logic signal having an operating voltage or a non-operating voltage. For example, the logic unit 233 is operated only while the enable signal EN is at an operating voltage level, and does not operate when the enable signal EN is at a non-operating voltage level. That is, the battery current control unit 230 may not be operated by applying the non-operating voltage to the logic unit 233.

The multiplexer 234 can output either a first register value REG1 or a second register value REG2 according to the first selection signal SEL1 and the second selection signal SEL2 supplied from the logic unit 233. For example, the multiplexer 234 can output the first register value REG1 when the first selection signal SEL1 is supplied from the logic unit 233, and can output the second register value REG2 when the second selection signal SEL2 is supplied from the logic unit 233. The first register value REG1 is a register value for controlling the output unit 238 to output a first low potential driving voltage VSSEL1, and the second register value REG2 is a register value for controlling the output unit 238 to output a second low potential driving voltage VSSEL2. The first low potential driving voltage VSSEL1 corresponds to the low potential driving voltage VSSEL which is initially set and can be applied to the pixels P in a normal state. The second low potential driving voltage VSSEL2 is applied to the pixels P when the battery voltage V_Ibat is equal to or higher than the threshold voltage V_Limit.

The PWM controller 235 can output the first control signal SC1 or the second control signal SC2 according to the first register value REG1 or the second register value REG2. For example, the PWM controller 235 can output the first control SC1 when the first register value REG1 is output from the multiplexer 234, and can output the second control SC2 when the second register value REG2 is output from the multiplexer 234.

Figure 5:
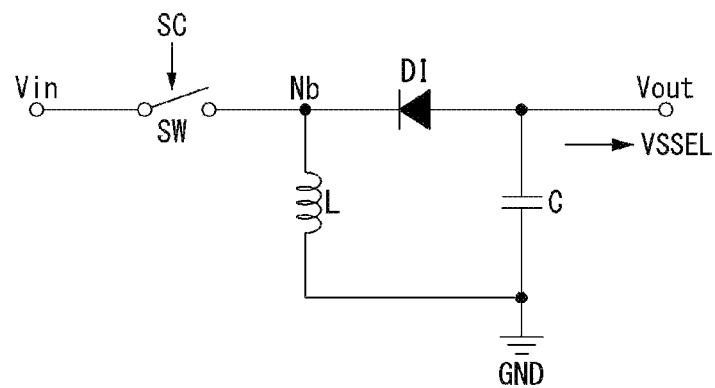
FIG. 5 is a diagram showing the configuration of an output unit shown in FIG. 4.

The output unit 238 adjusts the magnitude of the low potential driving voltage VSSEL according to the first control signal SC1 or the second control signal SC2 and can be implemented as a buck boost as shown in FIG. 5.

Figure 6:
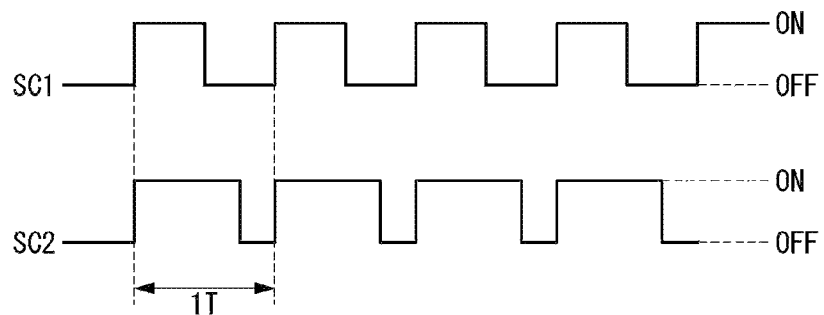
FIG. 6 is a timing chart of a control signal applied to a buck boost.

FIG. 5 is a diagram showing the configuration of the output unit 238 shown in FIG. 4, and FIG. 6 is a timing chart of the control signal applied to the buck boost.

Referring to FIG. 5, the output unit 238 can include a switch SW, an inductor L connected between a voltage boosting node Nb and the ground, a diode DI and a capacitor C connected in series between the voltage boosting node Nb and the ground. The diode DI can block the current flow from the voltage boosting node Nb to an output terminal Vout. The switch SW is located between an input terminal Vin and the voltage boosting node Nb and can operate in accordance with the control signal from the PWM controller 235.

When the switch SW is in a turn-on state, the current passing through the switch SW flows to the inductor L through the voltage boosting node Nb. As a result, the voltage of the inductor L rises, and the voltage of the output terminal Vout can also rise due to the coupling phenomenon of the capacitor C.

When the switch SW is in a turn-off state, a current flows from the output terminal Vout to the voltage boosting node Nb via the diode DI, and the voltage of the output terminal Vout can be lowered.

As shown in FIG. 6, the first control signal SC1 and the second control signal SC2 have different turn-on timings of the switch SW. The second control signal SC2 can be set to have a longer switch-on timing than the first control signal SC1. The output voltage Vout of the output unit 238 controlled by the second control signal SC2 is set higher than the output voltage Vout of the output unit 238 controlled by the first control signal SC1. For example, at the output of the output unit 238, VSSEL2 may be higher than VSSEL1.

Figure 7:
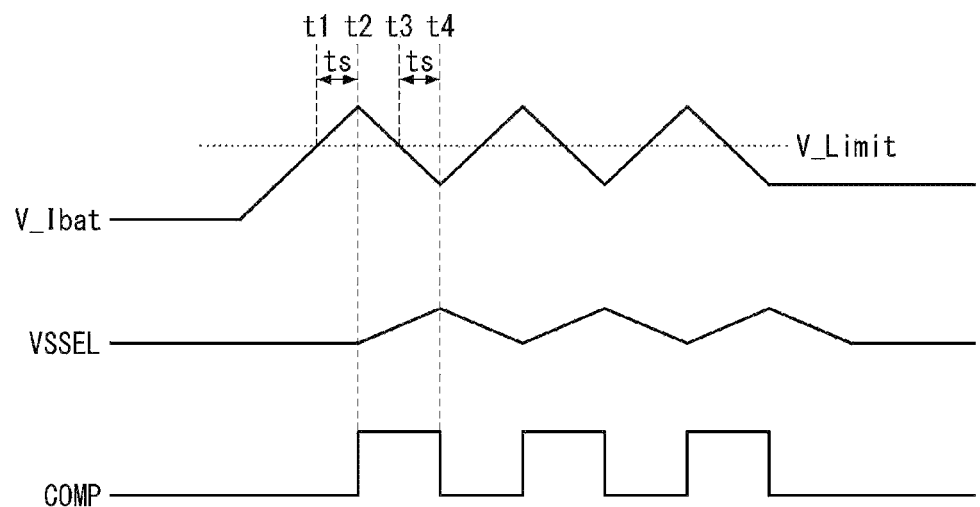
FIGS. 7 and 8 are diagrams showing the operation timing of the battery current control unit according to the embodiment of the present disclosure.

FIG. 7 is a timing chart showing the operation of the battery current control unit 230. Particularly, FIG. 7 explains the operation of the battery current control unit 230 according to high luminance driving when the battery charging voltage is within a reliable range.

Referring to FIG. 4 to FIG. 7, the operation of the battery current control unit 230 will be described below.

When the battery voltage V_Ibat reaches the threshold voltage V_Limit at a first timing t1, the comparator 232 counts a predetermined time ts. The comparator 232 can output the comparison voltage COMP at a second logic voltage which is a high level voltage at a second timing t2 after the predetermined time ts elapses from the first timing t1, if the battery voltage V_Ibat maintains the voltage equal to or higher than the threshold voltage V_Limit. The logic unit 233 outputs the second selection signal SEL2 responding to the comparison voltage COMP which is the second logic voltage. The multiplexer 234 can output the second register value REG2 according to the second selection signal SEL2. The PWM controller 235 can output the second control signal SC2 responding to the second register value REG2. As a result, the low potential driving voltage VSSEL output through the output terminal Vout of the output unit 238 can gradually rise.

When the battery voltage V_Ibat is lowered below the threshold voltage V_Limit at a third timing t3, the comparator 232 counts the predetermined time ts. The comparator 232 can output the comparison voltage COMP at a first logic voltage which is a low level voltage at a fourth timing t4 after the predetermined time ts elapses from the third timing t3, if the battery voltage V_Ibat maintains the voltage equal to or lower than the threshold voltage V_Limit. The logic unit 233 outputs the first selection signal SEL1 responding to the comparison voltage COMP which is the first logic voltage. The multiplexer 234 can output the first register value REG1 according to the first selection signal SELL The PWM controller 235 can output the first control signal SC1 responding to the first register value REG1. As a result, the low potential driving voltage VSSEL output through the output terminal Vout of the output unit 238 can gradually decrease. While the high luminance driving continues, the battery voltage V_Ibat swings at a value near the threshold voltage V_Limit and the low potential driving voltage VSSEL varies.

The battery current control unit 230 of the present disclosure can adjust the battery voltage V_Ibat by adjusting the magnitude of the low potential driving voltage VSSEL. This will be described with reference to FIG. 8

Figure 8:
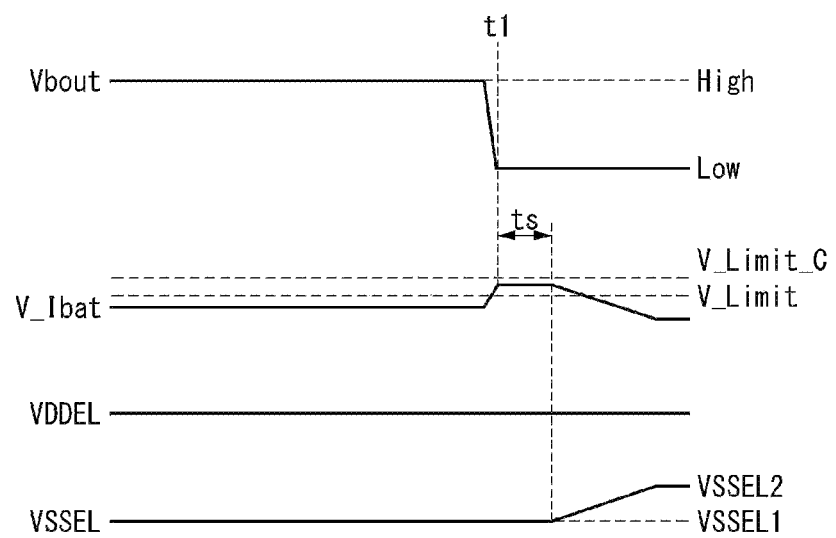

FIG. 8 is a diagram for explaining that the battery voltage V_Ibat is controlled by the battery current control unit 230.

Referring to FIGS. 4 to 8, after the battery voltage V_Ibat reaches the threshold voltage V_Limit at the first timing t1 and the predetermined time ts elapses, the battery current control unit 230 increases the magnitude of the low potential driving voltage VSSEL. The threshold voltage V_Limit is set to a voltage lower than the cutoff threshold value V_Limit_C for operating the battery blocking unit 210.

The power consumed by the display unit 100 is proportional to the difference between the high potential driving voltage VDDEL and the low potential driving voltage VSSEL. Therefore, when the low potential driving voltage VSSEL is increased, the power consumed by the display unit 100 can be reduced. The power consumed by the display unit 100 is preferably the same as the power which the battery 11 outputs. The power output from by the battery 11 also corresponds to the product of the battery charging voltage Vbout and the amount of current flowing into the voltage generating unit 200 from the battery 11. When the power consumption of the display unit 100 is reduced, the battery charging voltage is maintained, so that the amount of the battery current can be reduced. As a result, if the low potential driving voltage VSSEL is increased, the amount of the current flowing from the battery 11 to the voltage generating unit 200 (e.g., the battery output current Ibat) can be reduced.

The battery blocking unit 210 described with reference to FIGS. 2 and 3 cuts off the operation of the battery 11 based on the battery current. The magnitude of the battery current is inversely proportional to battery efficiency. That is, if the battery voltage decreases and the battery efficiency decreases, the magnitude of the battery current can increase.

The cutoff threshold value V_Limit_C for the operation of the battery blocking unit 210 is related to the reliability of the battery charging voltage Vbout. That is, when the battery charging voltage Vbout is within the normal range guaranteed by a system, it is normal that the battery voltage V_Ibat converted based on the battery current does not reach the cutoff threshold value V_Limit_C.

However, even when the battery charging voltage Vbout falls within the normal range when performing the high luminance driving, since the power efficiency is lowered, the battery current (or battery charging voltage Vbout) can reach the cutoff threshold value V_Limit_C. As described above, when the battery voltage V_Ibat obtained by converting the battery output current reaches the threshold voltage V_Limit, the battery current control unit 230 according to the present disclosure can lower the battery current (e.g., battery output current Ibat) by increasing the low potential driving voltage VSSEL. That is, the magnitude of the battery voltage V_Ibat in terms of the battery current is lowered and it is possible to prevent the battery voltage V_Ibat from reaching the cutoff threshold value V_Limit_C in the first place. As a result, even when the battery charging voltage Vbout is low, the battery 11 is not shut down easily, and display driving can be performed in a state in which the power consumption is reduced.

Of course, even if the battery current control unit 230 lowers the battery current in a state where the battery efficiency is significantly lowered, the battery voltage V_Ibat in terms of the battery current can reach the cutoff threshold value V_Limit_C. That is, when the battery efficiency is remarkably lowered, the battery blocking unit 210 can shut down the battery 11.

Figure 9:
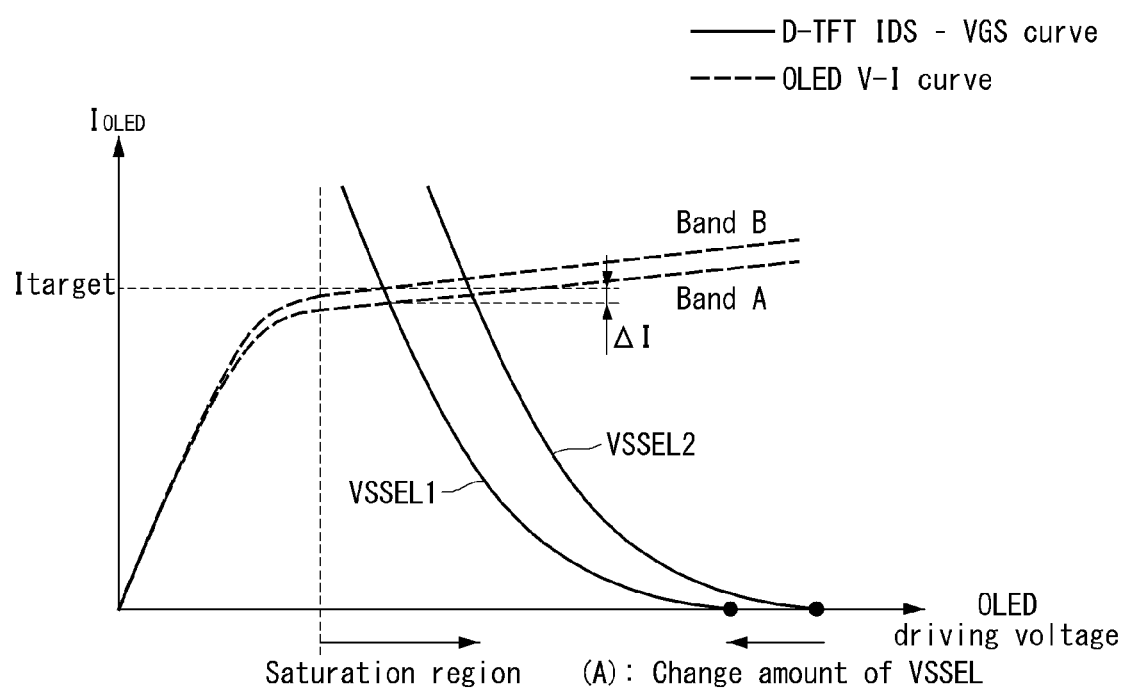
FIGS. 9 and 10 are diagrams for explaining a luminance change according to bands.
Figure 10:
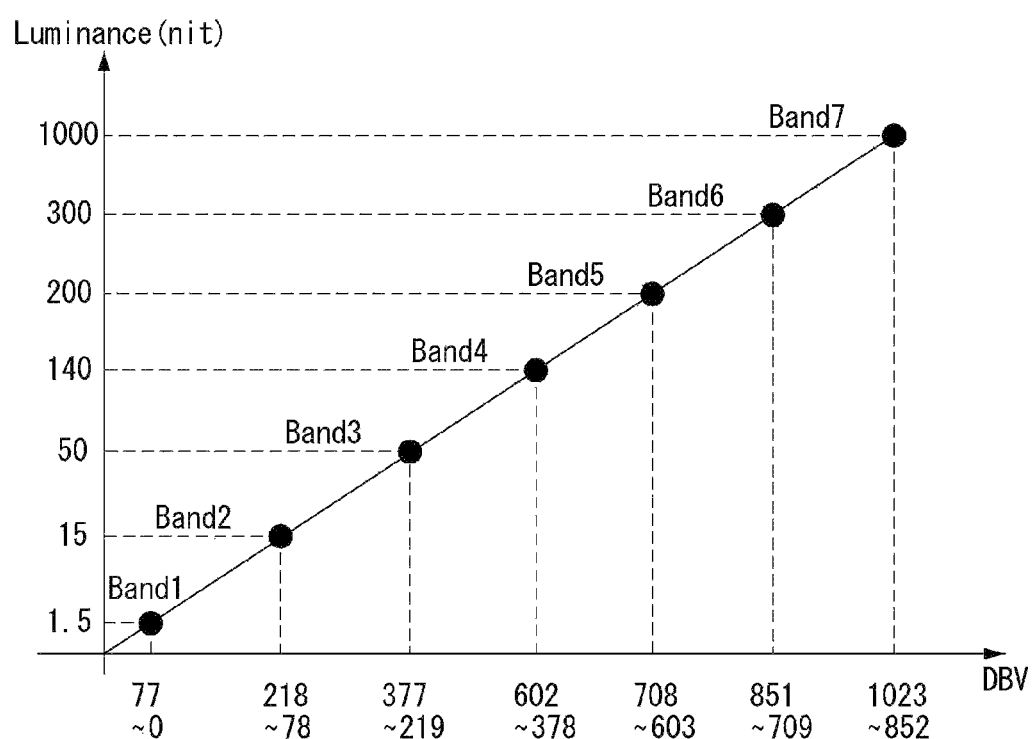

FIGS. 9 and 10 are diagrams for explaining the band adjustment according to the variation of the low potential driving voltage in accordance with an example of the present disclosure.

Referring to FIG. 9, if the magnitude of the low potential driving voltage VSSEL changes in a state that a band is the same, a luminance value changes. For example, in a state of being driven with the luminance corresponding to A band (Band A), when the low potential driving voltage VSSEL changes from a second low potential driving voltage VSSEL2 to a first low potential driving voltage VSSEL1, a driving current Ioled can be varied by the magnitude of 'ΔI'. That is, since the luminance of the pixel is proportional to the driving current, the luminance of the display device can be varied in proportion to 'ΔI'. Of course, the driving current is designed to operate in a saturation region, so that even if the change of 'ΔI' is small, it is impossible to prevent the luminance change occurring in a same band.

The band can be defined as a luminance value set according to a digital brightness value (DBV), as shown in FIG. 10. In a display device, the band is determined according to the DBV, and the data driver uses different gamma voltage values to display different brightnesses with respect to respective bands Band1 to Band7.

FIG. 10 shows an embodiment in which a high band is set to display a high luminance.

The gamma voltage generating unit 311 of the present disclosure varies the gamma voltage in response to the battery current control unit 230 varying the low-potential driving voltage VSSEL. For example, the gamma voltage generating unit 311 outputs a gamma voltage corresponding to a lower luminance as the magnitude of the low potential driving voltage VSSEL increases. For example, the gamma voltage generating unit 311 generates a gamma voltage with a first luminance value responding to the first low potential driving voltage VSSEL1 and generates a gamma voltage with a second luminance value that is lower than the first luminance value responding to the second low potential driving voltage VSSEL2.

As a result, the display device can display images with a target luminance value Itarget without a luminance being changed according to the magnitude of the low potential driving voltage VSSEL of the display unit 100.

The display device according to an embodiment of the present disclosure can include a liquid crystal display device LCD, a field emission display device FED, an organic light emitting display device, and a Quantum Dot Display Apparatus QD.

The display device according to an embodiment of the present disclosure can include a complete product or a final product including an LCM, an OLED module, etc. such as a notebook computer, a television, a computer monitor and an automotive apparatus, an equipment apparatus including other types of vehicle, a set electronic apparatus such as a mobile electronic apparatus including a smart phone or an electronic pad, and a set apparatus.

Examples of the display device according to the embodiment(s) of the present disclosure can be described as follows.

The display device according to an embodiment of the present disclosure can comprise a battery current control unit configured to adjust a magnitude of a low potential driving current. The battery current control unit can include a comparator configured to compare a battery voltage converted from a battery output current and a threshold voltage, output a first logic voltage when the battery voltage is equal to or higher than a first threshold value and output a second logic voltage when the battery voltage is lower than the first threshold value; an output controller configured to output a first control signal according to the first logic voltage from the comparator and output a second control signal according to the second logic voltage; and an output unit configured to output a first low potential driving voltage according to the first control signal and output a second low potential driving voltage according to the second control signal.

In an embodiment, the battery voltage can correspond to a value obtained by converting the battery output current to a voltage in proportional to a preset resistance value.

In an embodiment, the output controller can comprise a logic unit configured to a first selection signal according to the first logic voltage and output a second selection signal according to the second logic voltage; a multiplexer configured to output a preset first register value according to the first selection signal and output a preset second register value according to the second selection signal and; and a pulse width modulation controller configured to output the first control signal according to the first register value and output the second control signal according to the second register value.

In an embodiment, the output unit comprises a buck boost configured to increase a voltage of an output terminal in proportional to a turn-on period of a switch, and decrease the voltage of the output terminal in proportional to a turn-off period of the switch, and the second control signal has a longer turn-on period than the first control signal.

In an embodiment, the display device can comprise a display unit equipped with data lines, gate lines crossing the data lines and pixels; a voltage generating unit configured to generate driving voltages for driving the display unit based on a voltage from a battery; a data driver configured to convert input image data into data voltages and output the data voltages to the data lines; and a battery current control unit configured to control a magnitude of a low potential driving voltage applied to cathode electrodes of the pixels according to an amount of a current flowing from the battery to the voltage generating unit. The battery current control unit is configured to increase the low potential driving voltage when the battery output current is equal to or greater than a predetermined threshold value.

In an embodiment, the battery current control unit can comprise a comparator configured to compare a battery voltage converted from the battery output current and a threshold voltage, output a first logic voltage when the battery voltage is equal to or higher than a first threshold value and output a second logic voltage when the battery voltage is lower than the first threshold value; an output controller configured to output a first control signal according to the first logic voltage from the comparator and output a second control signal according to the second logic voltage; and an output unit configured to a first low potential driving voltage according to the first control signal and output a second low potential driving voltage according to the second control signal.

In an embodiment, the battery voltage can correspond to a value obtained by converting the battery output current to a voltage in proportional to a preset resistance value.

In an embodiment, the output controller can comprise a logic unit configured to a first selection signal according to the first logic voltage and output a second selection signal according to the second logic voltage; a multiplexer configured to output a preset first register value according to the first selection signal and output a preset second register value according to the second selection signal and; and a pulse width modulation controller configured to output the first control signal according to the first register value and output the second control signal according to the second register value.

In an embodiment, the output unit can comprise a buck boost configured to increase a voltage of an output terminal in proportional to a turn-on period of a switch, and decrease the voltage of the output terminal in proportional to a turn-off period of the switch, and the second control signal has a longer turn-on period than the first control signal.

In an embodiment, the display device can further comprise a battery blocking unit configured to compare the battery voltage with a predetermined cutoff threshold value, and blocks a current flow from the battery to the voltage generating unit when the battery voltage reaches the cutoff threshold value.

In an embodiment, the threshold voltage can be set as a voltage lower than the cutoff threshold value.

In an embodiment, the display device can further comprise a gamma voltage generator configured to generate a gamma voltage at a first luminance value in response to the first low potential driving voltage, and generate a gamma voltage at a second luminance value lower than the first luminance value responding to the second low potential driving voltage.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

What is claimed is:

1. A device for controlling an operation of a display unit, the device comprising:
   a battery current control unit configured to adjust a magnitude of a low potential driving current to be applied to a pixel of the display unit,
   wherein the battery current control unit comprises:
      a comparator configured to compare a battery voltage converted from a battery output current with a threshold voltage, output a first logic voltage when the battery voltage is equal to or higher than a first threshold value, and output a second logic voltage when the battery voltage is lower than the first threshold value;
      an output controller configured to output a first control signal according to the first logic voltage from the comparator, and output a second control signal according to the second logic voltage;
      an output unit configured to output a first low potential driving voltage to the pixel according to the first control signal, and output a second low potential driving voltage to the pixel according to the second control signal, and
   the device further comprising a battery blocking unit configured to compare the battery voltage of a battery with a predetermined cutoff threshold value, and block the battery output current from flowing from the battery to the display unit when the battery voltage reaches the cutoff threshold value, wherein the predetermined cutoff threshold value used by the battery blocking unit is higher than a value of the threshold voltage used by the comparator of the battery current control unit.

2. The device of claim 1, wherein the battery voltage corresponds to a value obtained by converting the battery output current to a voltage in proportional to a preset resistance value.

3. The device of claim 1, wherein the output controller comprises:
a logic unit configured to output a first selection signal according to the first logic voltage, and output a second selection signal according to the second logic voltage;
a multiplexer configured to output a preset first register value according to the first selection signal, and output a preset second register value according to the second selection signal and; and
a pulse width modulation controller configured to output the first control signal according to the first register value, and output the second control signal according to the second register value.

4. The device of claim 3, wherein the output unit comprises a buck boost configured to increase a voltage of an output terminal of the output unit in proportional to a turn-on period of a switch, and decrease the voltage of the output terminal in proportional to a turn-off period of the switch,
wherein the turn-on period and turn-off period of the switch are controlled based on one of the first and second control signals applied to the switch, and the second control signal has a longer turn-on period than the first control signal.

5. The device of claim 1, wherein the output unit includes:
a switch operating according to the first or second control signal of the pulse width modulation controller,
an inductor selectively connected with the switch and connected between a voltage boosting node and a ground, and
a capacitor connected between the voltage boosting node and the ground.

6. A display device, comprising:
a display unit including data lines, gate lines crossing the data lines and pixels;
a voltage generating unit configured to generate driving voltages for driving the display unit based on a voltage from a battery; and
a data driver configured to convert input image data into data voltages and output the data voltages to the data lines,
wherein the voltage generating unit includes:
a battery current control unit configured to control a magnitude of a low potential driving voltage applied to cathode electrodes of the pixels according to an amount of a battery output current flowing from the battery to the voltage generating unit,
wherein the battery current control unit is configured to increase the low potential driving voltage when the battery output current is equal to or greater than a predetermined threshold value, and
a battery blocking unit configured to compare a battery voltage converted from the battery output current of the battery with a predetermined cutoff threshold value, and blocks the battery output current flowing from the battery to the voltage generating unit when the battery voltage reaches the cutoff threshold value, wherein a value of the threshold voltage used by the comparator is set to be lower than the cutoff threshold value used by the battery blocking unit.

7. The display device of claim 6, wherein the battery current control unit comprises:
a comparator configured to compare the battery voltage converted from the battery output current of the battery with a threshold voltage, output a first logic voltage when the battery voltage is equal to or higher than a first threshold value, and output a second logic voltage when the battery voltage is lower than the first threshold value.

8. The display device of claim 7, wherein the battery current control unit further comprises:
an output controller configured to output a first control signal based on the first logic voltage from the comparator, and output a second control signal based on the second logic voltage from the comparator; and
an output unit configured to output a first low potential driving voltage based on the first control signal from the output controller, and output a second low potential driving voltage based on the second control signal from the output controller.

9. The display device of claim 8, wherein the output controller comprises:
a logic unit configured to output a first selection signal based on the first logic voltage, and output a second selection signal based on the second logic voltage.

10. The display device of claim 9, wherein the output controller further comprises:
a multiplexer configured to output a preset first register value based on the first selection signal output from the logic unit, and output a preset second register value based on the second selection signal output from the logic unit; and
a pulse width modulation controller configured to output the first control signal based on the first register value output from the multiplexer, and output the second control signal based on the second register value output from the multiplexer.

11. The display device of claim 8, wherein the output unit is configured to increase a voltage of an output terminal of the output unit in proportional to a turn-on period of a switch, and decrease the voltage of the output terminal in proportional to a turn-off period of the switch, and
wherein the turn-on period and turn-off period of the switch are controlled based on one of the first and second control signals applied to the switch.

12. The display device of claim 11, wherein the second control signal has a longer turn-on period than the first control signal.

13. The display device of claim 11, wherein the output unit includes:
the switch operating according to one of the first and second control signals,
an inductor selectively connected with the switch and connected between a voltage boosting node and a ground, and
a capacitor connected between the voltage boosting node and the ground.

14. The display device of claim 8, further comprising:
a gamma voltage generator configured to generate a gamma voltage at a first luminance value in response to the first low potential driving voltage, and generate a gamma voltage at a second luminance value lower than the first luminance value in response to the second low potential driving voltage.

15. The display device of claim 7, wherein the battery voltage corresponds to a value obtained by converting the battery output current of the battery to a voltage in proportional to a preset resistance value.

* * * * *